United States Patent [19]

Clerc et al.

[11] Patent Number: 4,626,072
[45] Date of Patent: Dec. 2, 1986

[54] MATRIX DISPLAY AND METHOD OF CAPACITANCE COMPENSATION VIA CHARGE DISTRIBUTION

[75] Inventors: Jean F. Clerc, Meylan; Denis Sarrasin, Rives dui Fure, both of France

[73] Assignee: Commissariat a l'Energie Atomique, Paris, France

[21] Appl. No.: 573,711

[22] Filed: Jan. 25, 1984

[30] Foreign Application Priority Data

Feb. 16, 1983 [FR] France ............... 83 02494

[51] Int. Cl.$^4$ ............ G02F 1/133; G09G 3/00
[52] U.S. Cl. .................. 350/333; 350/336; 340/718
[58] Field of Search ........... 350/333, 334, 336, 391, 350/392; 340/805, 718, 719

[56] References Cited

U.S. PATENT DOCUMENTS

| | | | |
|---|---|---|---|
| 3,655,269 | 4/1972 | Heilmeier | 350/333 |
| 3,914,019 | 10/1975 | Byatt | 350/336 |
| 3,991,416 | 11/1976 | Byles et al. | 350/332 |
| 4,387,963 | 6/1983 | Brennan | 350/331 T |
| 4,449,125 | 5/1984 | Clerc et al. | 350/333 X |
| 4,509,828 | 4/1985 | Clerc et al. | 350/334 X |

FOREIGN PATENT DOCUMENTS

| | | | |
|---|---|---|---|
| 2279123 | 2/1976 | France | 350/333 |
| 2489569 | 5/1982 | France | 350/357 |

OTHER PUBLICATIONS

Gladstone et al., "Liquid Crystal Display Device Configuration", IBM Techical Disclosure, vol. 15, No. 2, Jul. 1972, pp. 437-438.

Primary Examiner—John K. Corbin
Assistant Examiner—David Lewis
Attorney, Agent, or Firm—Oblon, Fisher, Spivak, McClelland & Maier

[57] ABSTRACT

The invention relates to a matrix display provided with a coupling compensation device between the rows and columns. The matrix display comprises a material, whose optical characteristic can be modified, said material being interposed between a group of row electrodes and a group of column electrodes, whose intersections $X_iY_j$ are the addressable points of the matrix display. It also comprises at least one compensation electrode and means for raising said compensation electrode to an appropriate potential for eliminating parasitic charges appearing on the row electrodes.

3 Claims, 3 Drawing Figures

MATRIX DISPLAY AND METHOD OF CAPACITANCE COMPENSATION VIA CHARGE DISTRIBUTION

BACKGROUND OF THE INVENTION

1. Field of the Invention

The present invention relates to a matrix display with a device for compensating the coupling between rows and columns. It is used in optoelectronics in the production of liquid crystal displays more particularly used as converters of electrical information into optical information.

2. Discussion of Background

In per se known manner, matrix displays comprise a display cell constituted by two transparent insulating walls and by a material having a plurality of areas distributed in the form of matrixes and interposed between a first group of electrodes covering one of the two walls and defining p control rows and a second group of electrodes covering the other wall, constituted by parallel conductive strips and defining q control columns, line $X_i$, in which i is an integer such as $1 \leq i \leq p$ and column $Y_j$, in which J is an integer such as $1 \leq j \leq q$, defining an area $X_iY_j$ of the material and having means making it possible to supply on the rows and columns appropriate excitation signals used for exciting an optical property of the material.

Numerous devices of this type are known for which the excitation is of an electrical nature and which e.g. use as the sensitive material a liquid crystal film. The invention can be applied with particular advantage to such devices, but it also applies in more general terms to any devices having a material, whereof an optical property can be modified with the aid of an electrical excitation. The material can be a liquid or solid, amorphous or crystalline body. The optical property can be an opacity, a refractive index, a transparency, an absorption, a diffusion, a diffraction, a convergence, a rotary power, a birefringence, an intensity reflected in a given solid angle, etc.

A known process for the control of such display means consists e.g. in the case of a liquid crystal cell in which the excitation is of an electrical nature, of applying to row $X_i$, a periodic voltage $V_{xi}$ of mean value zero, whilst to the other rows is applied a zero voltage. To the columns $Y_j$ are applied periodic voltage $V_{yj}$ of zero mean value and of the same duration and frequency as voltage $V_{xi}$, but which are phase-displaced relative thereto by a quantity $\Phi_{ji}$. The value of this phase displacement $\Phi_{ji}$ is between 0° for the signals $V_{xi}$ and $V_{yj}$ in phase and 180° for signals $V_{xi}$ and $V_{yj}$ in phase opposition controls the grey level of point $X_iY_j$.

In reality, the rising fronts of the addressing voltages $V_{yj}$ reaching the columns of a matrix display disturb, as a result of a capacitive effect, the voltages applied to the rows. In particular, an unselected line, which is normally subject to a zero voltage, is the seat of an intergering or parasitic voltage.

FIG. 1 shows the signals appearing on the electrode rows and the electrode columns. All the electrode rows are connected to earth, with the exception of row $X_i$ in which $1 \leq i \leq p$ and to which is applied a voltage square wave, such as signal a. A periodic voltage is simultaneously applied to each column. The phase difference $\Phi_{ij}$ between signal a applied to row $X_i$ and the signal applied to column $Y_j$ determines the grey level of point $X_iY_j$. To simplify the representation of the signals, the case has been assumed of the column signals either being in phase ($\Phi_{ij}=0$), or in phase opposition ($\Phi_{ij}=180°$) with the signal a. This obviously does not constitute a limitation of the scope of the invention, which also covers cases in which the phase displacement $\Phi_{ij}$ is of a random nature. However, in such a case, the voltage at the terminals of cell $X_iY_j$ is more complex. Therefore, we will represent column signals which are only in phase or in phase opposition with the row signal. The column signals are consequently represented by signal b in phase with signal a, or by signal e in phase opposition with signal a. By capacitive effect, on the rows connected to earth, there appears an interfering signal, like signal c.

The original of this interfering signal is as follows. At a time t between 0 and T/2, in which T is the period of the signals applied to the electrodes, the voltages on the electrodes are constant and equal to $+V$ or $-V$. On a column electrode subject to the voltage $+V$ appears, in front of area $X_iY_j$ in which i is a row connected to earth, an electrical charge $-Q$ and on row electrode i, facing area $X_iY_j$, an electrical charge $+Q$. On a row electrode subject to a voltage $-V$, the electrical charge produced will be reversed, as will be the electrical charge appearing on row i. On writing $\Sigma_Q$, the algebraic sum of the electrical charges present on line $i\Sigma_Q$ is not generally zero. It is not zero if there are the same number of column electrodes subject to a voltage $+V$ as column electrodes subject to a voltage $-V$. At a time t between T/2 and T, there is a charge $-\Sigma_Q$ on row i in a symmetrical manner. At T/2, there is consequently a supply of $-2\Sigma_Q$ electrical charges to row i and, as the display material is of an insulating nature, these charges are supplied by the row electrode i. Signal c translates the electric current no matter what the charge transfer. Signal c is in phase with the majority column signal, i.e. it is in phase with signal b if the majority of the column signals are in phase with signal a and it is in phase with signal e if the majority of the column signals are in phase opposition with signal a. In FIG. 1, a signal c is shown to be in phase with signal b. At the intersection of an unselected row and a column to which the signal b is applied, the potential difference applied to the material would be equal to signal b. However, due to the parasitic capacitive effect, the voltage applied at this point is represented by signal d which is equal to the difference between signals b and d. In the same way, the points belonging to an unselected line and whose column signal is represented by signal e are subject to a potential difference represented by signal f and equal to the difference between signals e and c, instead of being subject to a potential difference represented by signal e.

If there was no interference, a point of a row connected to earth and subject to a potential difference represented by signal b and a point of the same row subject to a potential difference represented by the signal e, would be subJect to the same excitation, because the area B of signal b is equal to area E of signal e. Due to the parasitic coupling between the rows and columns, signals b and e are respectively replaced by signals d and f. In the first case, the area below the curve of signal d equal to D is decreased, In the second case, the area beneath the curve of signal f and equal to F is increased. However, the excitation of the material varies like the square of the potential difference, i.e. like the area beneath the curve of the signal. Thus, this area difference leads to a parasitic visual phenomenon, such as lines on the screen.

SUMMARY OF THE INVENTION

The problem of the invention is to obviate the parasitic visual effect. To this end, the invention proposes adding to the column electrode system at least one compensation electrode which serves to supply each row with electrical charges, such that the algebraic sum of the electrical charges on each unselected row is zero at all times. This compensation electrode is not part of the display area. A means to supply this compensation electrode with an appropriate voltage is also provided. The current passing along each of the unselected rows is then zero at each switching operation, ie.. at multiple times of T/2, so that its voltage is also zero.

More specifically, the present invention relates to an electrically controlled matrix display incorporating a material whose optical characteristics can be modified, said material being interposed between a first group of p rows of parallel electrodes and a second group of q columns of parallel electrodes, the rows and columns intersecting one another, an area $X_{ij}$ of the material being defined by the region of the material covered by row i, in which i is an integer such that $1 \leq i \leq p$ and by column j, in which j is an integer such that $1 \leq j \leq q$, said rows being sequentially selected and said columns being simultaneously selected to carry electrical signals bringing about an excitation of the material suitable for modifying its optical characteristics. The matrix display of the invention also comprises a device for compensating the coupling between the rows and columns, the device including least one compensation electrode and a means for supplying each compensation electrode with a specific voltage signal, each compensation electrode intersecting all the electrodes of the first group of electrodes and being separated therefrom by a dielectric, and being parallel to the electrodes of the second group of electrodes, the means supplying a voltage signal to each compensation electrode to make electrical charges appear on each row electrode not selected, with the intensity of the voltage signal being such that the algebraic sum of the electrical charges on each row of electrodes not selected is zero at all times.

According to a preferred embodiment, the coupling compensation device comprises two compensation electrodes placed on either side of the q electrodes of the second group of electrodes.

According to a secondary feature, the dielectric between the compensation electrodes and the electrodes of the first group is the same as the dielectric between the electrodes of the first group and the electrodes of the second group.

Other features and advantages of the invention can be gathered from the following illustrative and non-limitative description. For reasons of clarity, the description refers to a liquid crystal matrix display, whose optical properties vary as a function of the electrical field applied thereto. Despite the fact that the invention has much more general applications, these displays are known and widely used, so that it is preferable to provide a description relative thereto.

BRIEF DESCRIPTION OF THE DRAWINGS

The invention is described in greater detail hereinafter relative to the drawings, wherein show.

DETAILED DESCRIPTION OF THE INVENTION

Figure 2:
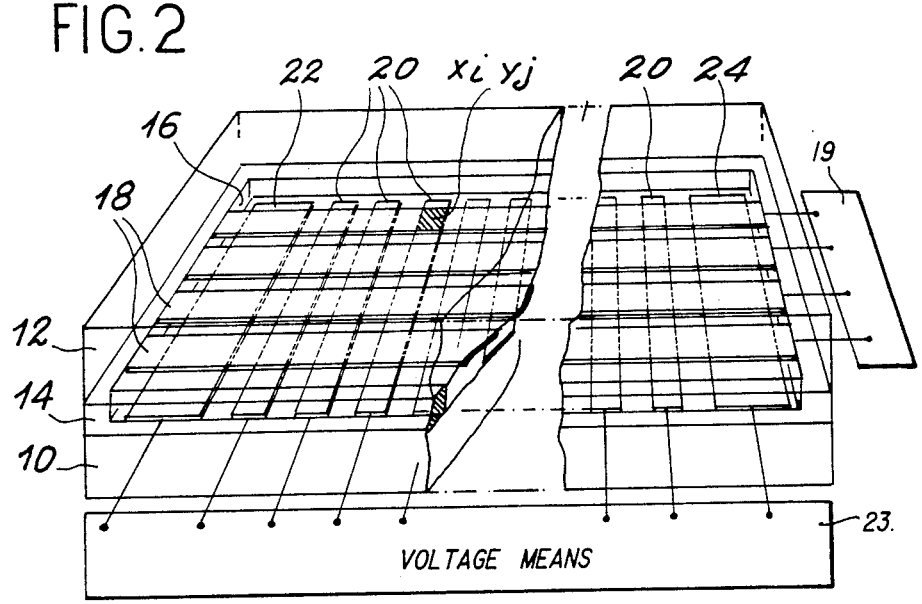
FIG. 2, a matrix display according to the invention, which eliminates the interfering signals represented in FIG. 1.

FIG. 2 shows a matrix display according to the invention comprising a cross-bar display cell having two generally transparent walls 10, 12, arranged on either side of an insulating material shim 14, defining a volume 16 which is occupied, when the cell is fitted, by the material whose optical characteristics are controlled, e.g. a liquid crystal film. On wall 12 is deposited a first group of p rows of electrodes 18 and on the second wall 10 is deposited a second group of q columns of electrodes 20, each constituted by a series of parallel conductive transparent strips, made e.g. from indium oxide and designated $X_i$ for the rows and $Y_j$ for the columns. The useful surface of the liquid crystal is consequently broken down into a mosaic of areas corresponding to the overlap areas of the groups of electrodes, each area corresponding to the overlap of two strips $X_i$ and $Y_j$ and which can therefore be designated $X_iY_j$.

The excitation of an area, i.e. the control of an optical property of the liquid crystal contained therein, takes place by applying to electrodes $X_i$ and $Y_j$ electrical voltages supplied by electric power supplies which lead to the appearance of an electric field within the liquid crystal. These well known power supplies utilize a first control means 19 to select sequentially each row electrode 18 and the voltage means 21 to select simultaneously each column electrode 20. The modification of the optical characteristics of the liquid crystal at the intersection of a selected column electrode and a selected row electrode depends on the difference in phase of the voltage signal applied to these electrodes. Thus, an image is made to appear on the complete crystal, whilst defining it point by point and by successively sensitizing the areas in accordance with the known sequential control principles, taking advantage of the considerable amount of time for the decrease of the optical effect induced in the liquid crystal.

According to the invention, the matrix display also comprises compensation electrodes. FIG. 2 shows two compensation electrodes 22, 24 which are parallel to the column electrodes and intersect the p electrode rows. The function of the compensation electrodes 22, 24 is to supply to each of the unselected rows electrical charges such that the algebraic sum of the electrical charges on each of the unselected rows is zero at all times.

Figure 1:
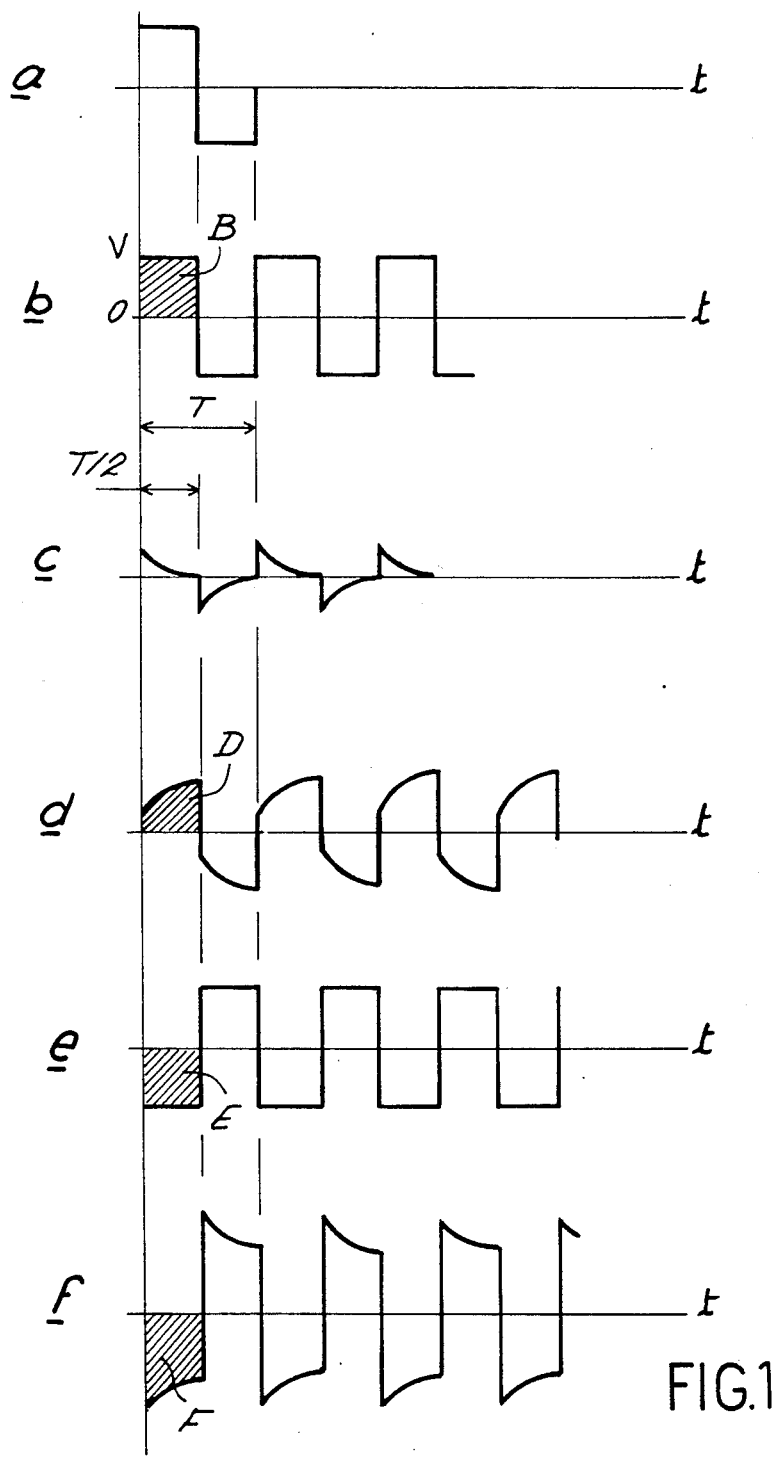
FIG. 1, already described, the interference introduced onto row and column signals of a matrix display according to the prior art.
Figure 3:
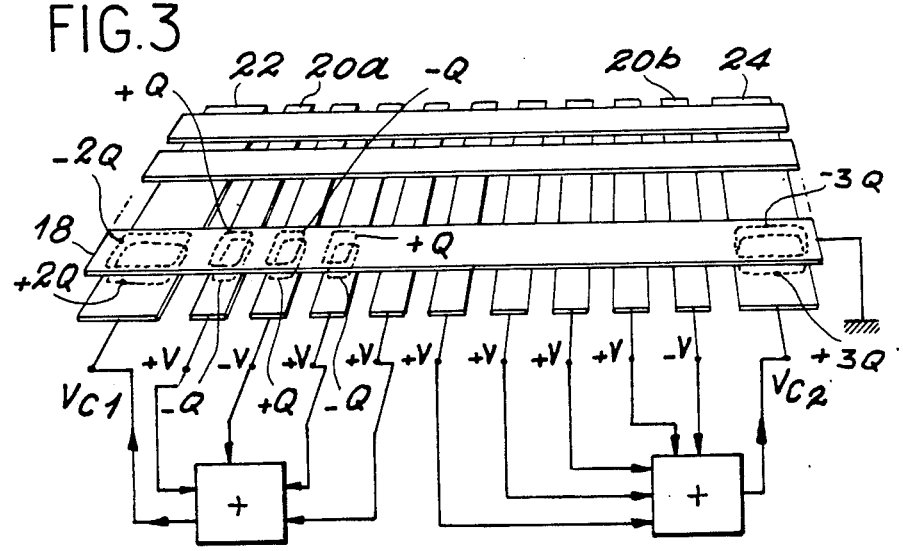
FIG. 3, the electrical state of an unselected row and column electrode.

FIG. 3 shows all the column electrodes 20a, 20b, as well as the compensation electrodes 22, 24, together with an unselected row electrodes 18, i.e. connected to earth. The electrical charges localized on each of these electrodes are also diagrammatically shown. For reasons of clarity, it is assumed, as in FIG. 1, that the voltages applied to the column electrodes 20 are either in phase or in phase opposition with the voltage square wave applied to the not shown, selected row electrode. At a given time, they will consequently have a voltage +V on certain column electrodes 20a and a voltage in phase opposition, i.e. a voltage −V on certain other column electrodes 20b. The voltages applied are periodic voltages of period T. For a duration T/2, e.g. between 0 and T/2, the signal applied to each column will consequently have a certain sign. The sign of this voltage will be reversed at T/2. In more general terms, this voltage will be reversed periodically at time intervals separated by T/2. As a non-limitative example, the matrix display shown in FIG. 3 comprises 9 electrode columns. Each of these electrodes is subject to a voltage +V or −V, as shown in the drawing. At the intersection of each of these column electrodes with the row electrode 18 connected to earth, electrical charges appear. On a column electrode 20a subject to a positive voltage +V will appear an electrical charge −Q and facing it on row 18 an electrical charge +Q. These charges are localized on area $X_iY_j$. The sum of the electrical charges appearing on row electrode 18 is not zero. It is easy to see that the sum of the algebraic charges present on row electrode 18 is proportional, to within the sign, to the algebraic sum of the voltages applied to the column electrodes 20a and 20b. In the case of the drawing, the sum of the electrical charges is equal to 5Q. It is therefore appropriate to apply to the compensation electrodes 22 and 24 voltages proportional to the algebraic sum of the voltage applied to the column electrodes 20a, 20b in order to supply −5Q charges, which would cancel out the algebraic sum of the charges present on the row electrode 18.

For example, as shown in FIG. 3, it is possible to apply a voltage $V_{c1}$ to compensation electrode 22, which is proportional to the algebraic sum of the voltages applied to the four column electrodes closest to it and a voltage $V_{c2}$ to the compensation electrode 24 proportional to the algebraic sum of the voltages applied to the 5 other column electrodes. The means for supplying each compensating electrode with such voltage signals are voltage means for each compensation electrode. This is the same as supplying −2Q charges to the compensation electrode 22 and −3Q charges to the compensation electrode 24. It is also possible to envisage applying identical voltages $V_{c1}$ and $V_{c2}$. In more general terms, any combination leading to the cancelling out of the electrical charges on row electrode 18 is also possible.

It is known that the charge Q of the capacitor is equal to $$\frac{1}{4\pi} \frac{\epsilon}{d} S_U,$$

in which $\epsilon$ is the electrical permittivity of the electrode, S the surface of the electrodes of the capacitor, U the potential difference between the capacitor electrodes and d the distance between the electrodes.

The electrical charge present on row electrode 18 produced by the q column electrodes 20a, 20b is consequently equal to $$\frac{1}{4\pi} \frac{\epsilon}{d} c1 S \epsilon V,$$

in which $\epsilon_{c1}$ is the electrical permittivity of the liquid crystal, d the distance between the row electrode 18 and the column electrodes 20a, 20b, S the surface of an area $X_iY_j$ and $\tau V$ the algebraic sum of the voltages applied to the q column electrodes 20a and 20b. To cancel out this electrical charge, it is possible e.g. to use a compensation electrode 22 identical to the column electrodes 20 separated from the row electrodes 18 by the liquid crystal. This assumes that the compensation electrode 22 can be subject to a potential between $-_qV$ and $+_qV$ (if there is a single compensation electrode).

Another solution which is also possible consists of using between compensation electrode 22 and row electrodes 18, a dielectric, whose electrical permittivity $\epsilon$ is different from that of the liquid crystal. It is also possible to act on parameters d or S. In general terms, any construction leading to the supply of electrical charges to a row of electrodes 18 cancelling out the algebraic sum of the electrical charges on said electrode is in accordance with the invention.

What is claimed is:

1. A method for compensating a coupling between rows and columns of an electrically controlled matrix display wherein said matrix display has a material having modifiable optical characteristics, said material being interposed between a first group of p rows of parallel electrodes and a second group of q columns of parallel electrodes, the rows and columns intersecting one another, wherein an area $X_{ij}$ of the material being defined by the region of the material covered by row i, in which i is an integer such that $1 \leq i \leq p$ and by column j, in which j is an integer such that $1 \leq j \leq q$, said rows being selected and said columns being selected to carry electrical signals bringing about an excitation of the material suitable for modifying its optical characteristics comprising the steps of:

providing a device for compensating the coupling between the rows and columns, by providing at least one compensating electrode; and each said compensation electrode intersecting all of the electrodes of the first group of electrodes and being separated therefrom by a dielectric, and being parallel to the electrodes of the second group of electrodes, supplying each said compensation electrode with a specific voltage signal which provides electrical charges on each unselected row of electrodes, the intensity of said voltage being such that the algebraic sum of the electrical charges on each unselected row of electrodes is zero at all times.

2. A method according to claim 1, wherein the step of providing at leat one compensation electrode involves two compensation electrodes arranged on either side of the q electrodes of the second group of electrodes.

3. A method according to claims 1 or 2, wherein the dielectric between the compensation electrodes and the electrodes of the first group of electrodes is the same as the dielectric between the electrodes of the first group of electrodes and the electrodes of the second group of electrodes.

* * * * *